(12) United States Patent
Michaelidis et al.

(10) Patent No.: US 6,764,190 B2
(45) Date of Patent: Jul. 20, 2004

(54) LIGHTING DISPLAY SYSTEM

(75) Inventors: Spiros Michaelidis, Chelsea (AU); Constantine Michaelidis, Chelsea (AU)

(73) Assignee: Spicon Industries Pty. Ltd., Chelsea (AU)

( * ) Notice: Subject to any disclaimer, the term of this patent is extended or adjusted under 35 U.S.C. 154(b) by 0 days.

(21) Appl. No.: 10/204,336

(22) PCT Filed: Feb. 19, 2001

(86) PCT No.: PCT/AU01/00168

§ 371 (c)(1),
(2), (4) Date: Aug. 16, 2002

(87) PCT Pub. No.: WO01/61676

PCT Pub. Date: Aug. 23, 2001

(65) Prior Publication Data

US 2003/0012010 A1 Jan. 16, 2003

(30) Foreign Application Priority Data

Feb. 18, 2000 (AU) .............................................. PQ5729

(51) Int. Cl.[7] .................................................. F21V 7/04
(52) U.S. Cl. .......................... 362/31; 362/223; 362/235; 362/326; 362/812; 362/27; 362/330; 362/333
(58) Field of Search .......................... 362/31, 223, 235, 362/326, 812, 26, 27, 330, 333, 339, 290–292, 342, 354, 376; 385/901, 129, 130

(56) References Cited

U.S. PATENT DOCUMENTS 6,231,200 B1 * 5/2001 Shinohara et al. ............ 362/31
6,283,602 B1 * 9/2001 Kawaguchi et al. .......... 362/31
6,480,649 B2 * 11/2002 Lee ............................... 385/31
6,578,976 B2 * 6/2003 Bothe et al. .................. 362/31

FOREIGN PATENT DOCUMENTS

| GB | 2325772 | 12/1998 |
|---|---|---|
| WO | WO 92/05535 | 4/1992 |

* cited by examiner

Primary Examiner—Sandra O'Shea
Assistant Examiner—Sharon Payne
(74) Attorney, Agent, or Firm—David R. Preston & Assoc., A.P.C.; Thomas D. Foster; Mo Savari

(57) ABSTRACT

The present invention includes an illuminated sign display assembly comprising: a transparent panel having two oppositely facing planar surfaces separated by a surface forming a linear edge between said oppositely faced surfaces, one of said oppositely facing surfaces adapted to support a sign; a light source on or adjacent to said linear edge for transmitting light between said opposite facing surfaces; characterised in that at least one of said oppositely facing surfaces has applied thereon at least one single continuous line forming a matrix extending substantially over the entire surface of said at least one of said oppositely facing surfaces. The applicants have found that the sign display assembly of the present invention enables even distribution of transmitted light and effectively illuminates the entire panel even at distances remote from the light source.

13 Claims, 8 Drawing Sheets

LIGHTING DISPLAY SYSTEM

FIELD OF THE INVENTION

This application claims benefit of priority to Australian Patent Application PQ5729 filed on Feb. 18, 2000, and International Patent Application No. PCT/AU01/00168 filed on Feb. 19, 2001 to Spiros Michaelidis and Constantine Michaelidis, each of which applications are incorporated by reference.

The present invention relates to a sign display panel assembly which is able to efficiently illuminate an entire surface area of a display or sign held thereon.

More particularly, the present invention relates to a sign display assembly having at least one single line matrix applied to a transparent substrate through which light may be transmitted for the purpose of evenly illuminating a display or sign placed on the substrate.

BACKGROUND OF THE INVENTION

Illuminated display panels are known. Generally an illuminating display system comprises a transparent panel upon which at least one surface of the panel there has been imprinted a series of lines or dots usually by way of screen printing.

The prior art has generally attempted to increase the extent of illumination across one surface of a panel, however these attempts have been unsuccessful and non-economic particularly when applied to large surface areas.

In one such prior art attempt at least one planar surface of a transparent sheet has a matrix of dots applied thereon. The disadvantage of the system of dots is that the dots do not enable sufficient transmission of light for even illumination of a surface, and that in order to obtain desirable luminosity using dots a significantly thicker substrate is required giving rise to cost and weight escalation.

In even further prior attempts there has been disclosed illuminating display assemblies which include a panel, a light source lying adjacent the panel, and having at least one surface of the panel covered with a plurality of adjacent rows or bands of separate straight lines such that the lines extend at right angles from a side edge of the panel, adjacent the light source, while the rows or bands extend in a direction parallel to the light source.

The problem with this type of prior art display system is that the plurality of lines causes (a) significant absorption of light thereby adversely reducing illumination, and (b) is very expensive to manufacture.

Prior art systems of this latter type also exhibit a phenomenon known as line banding. For example, the applicants have found that a panel which has a series of lines extending perpendicular to a light source in rows printed thereon will produce an undesirable illuminated pattern of alternating bright and dark lines.

It has also been found by the present applicants that the prior art series of lines fails to effectively illuminate peripheral edges of a display panel.

One object of the present invention is to provide an alternative illumination assembly which reduces one or more of the aforementioned disadvantages.

SUMMARY OF THE INVENTION

The applicants of the present invention have addressed the difficulties faced in prior art systems by way of providing a substrate which contains at leats one continuous interconnecting single line matrix embedded on or within one or both surface(s) of the substrate so as to effectively evenly distribute light across said one or both surface(s).

In one aspect the present invention includes an illuminated sign display assembly including:

a transparent substrate having two oppositely facing surfaces separated by a surface forming an edge between said oppositely facing surfaces; and a light source on or adjacent to said edge for transmitting light between said opposite facing surfaces of said substrate;

characterised in that at least one of said oppositely facing surfaces of said substrate has applied thereon at least one continuous line forming an interconnecting cellular matrix extending substantially over said one or both oppositely facing surfaces.

The applicants have found that the sign display assembly of the present invention enables even distribution of transmitted light and effectively illuminates the entire panel even at distances remote from the light source. The applicants have also found that their single continuous line matrix effectively illuminates all peripheral edges of a substrate on which the line has been applied and requires a substantially thinner substrate than the prior art thereby obviating cost and weight problems.

In a second aspect of the invention there is disclosed a method of illuminating a sign display assembly, said sign display assembly including:

a transparent substrate having two oppositely facing surfaces separated by a surface forming an edge between said oppositely facing surfaces; and a light source on or adjacent to said edge for transmitting light between said opposite facing surfaces of said substrate;

said transparent substrate having applied thereto, on at least one oppositely facing surface, at least one continuous line forming an interconnecting cellular matrix extending substantially over said at least one oppositely facing surface;

activating said light source adjacent said edge so as to transmit light between said surfaces thereby illuminating said substrate.

It is preferred that the at least one line is applied to at least one surface of the substrate in a single continuous movement.

Because the present application does not include an arrangement containing a series of separate lines, the problem of light absorption and line banding associated with the prior art does not occur.

PREFERRED ASPECT OF THE INVENTION

Preferably the interconnecting cellular matrix is formed by a single continuous line. The continuous line preferably extends in a direction perpendicular and parallel to said light source. In this preferred aspect the interconnecting cellular matrix forms an array of cells of generally rectangular or square geometry.

Preferably the interconnecting cellular matrix comprises an alternating series of open and closed cellular structures formed from said single continuous line substantially adjacent said edge.

In an alternative embodiment it is preferred that the interconnecting cellular matrix comprises a continuous series of closed cellular structures substantially adjacent said edge.

Preferably an interconnecting cellular matrix formed by a single continuous line consists of an even number of cells extending in directions both parallel and perpendicular to said light source. In this embodiment the geometry of cells formed by the interconnecting line matrix is substantially square.

More preferably the interconnecting cellular matrix formed by the single continuous line has an uneven number of cells in any one or both direction(s) perpendicular and parallel to the light source. In this embodiment it is understood that the number of cells formed in a direction parallel or perpendicular to the light source can progressively increase in frequency in any one or both direction(s). Hence the geometry of the cells formed by the line may change or become distorted as the frequency of cells changes.

Most preferably the frequency of cells formed by the interconnecting cellular matrix progressively increases with increasing distance in a direction perpendicular to the light source. The applicant has found that by increasing the frequency of cells in the above manner enhanced luminosity is achieved at surfaces remote from the light source.

The present applicants have found that their interconnecting matrix formed from a single continues line is able to significantly improve distribution of light illumination evenly across the surface(s) of a substrate.

Preferably the illuminated sign display assembly comprises more than one light source.

Preferably the transparent substrate is any described geometry selected from but not limited to planar, radial, undulating, triangular or curved.

Preferably the transparent substrate is selected from an acrylic plastic, polycarbonate, glass or any clear material through which light can be transmitted.

Preferably the substrate has a thickness of less than 10 mm. More preferably the substrate has a thickness within the range of between 4.5 mm to 6 mm. It is understood by the applicants that the application of a single line to the substrate to form an interconnecting cellular matrix increases luminosity to such an extent that the thickness of the substrate and associated costs can be significantly reduced.

Preferably at least one continuous line can be applied to one or both oppositely facing surfaces of the transparent panel.

Preferably the illuminated sign display assembly further comprises a prism extending parallel and adjacent to said light source so as to provide a greater surface area through which light may be directed into the substrate.

Preferably the light source is positioned on or above one of said oppositely facing surfaces adjacent said linear edge.

Preferably the interconnecting cellular matrix formed by at least one continuous line is applied to one or both surface(s) of said oppositely facing surfaces by means of, but not limited to, scarring, etching, scratching, painting, sand blasting, screen printing, laser or the like.

Preferably the illuminated sign display assembly further includes a transparent image, poster or hologram.

Preferably the linear edge separating said oppositely facing surfaces of said substrate is provided at an angle to the light source so as to increase the surface area through which light may be transmitted from the light source. More preferably the linear edge is provided at an angle of about 45° to the light source.

Further description of the invention is now presented with reference to the drawings.

INTEGER LIST

1. Transparent substrate.
2. Top facing surface.
3. Bottom facing surface.
4. Linear edge.
5. Single continuous line matrix.
6. Light source.
7. Prism.
8. Angled edge.
9. Closed cell.
10. Open cell.
11. Cell edges.

DESCRIPTION OF THE PREFERRED EMBODIMENT WITH RESPECT TO THE DRAWINGS

Figure 1:
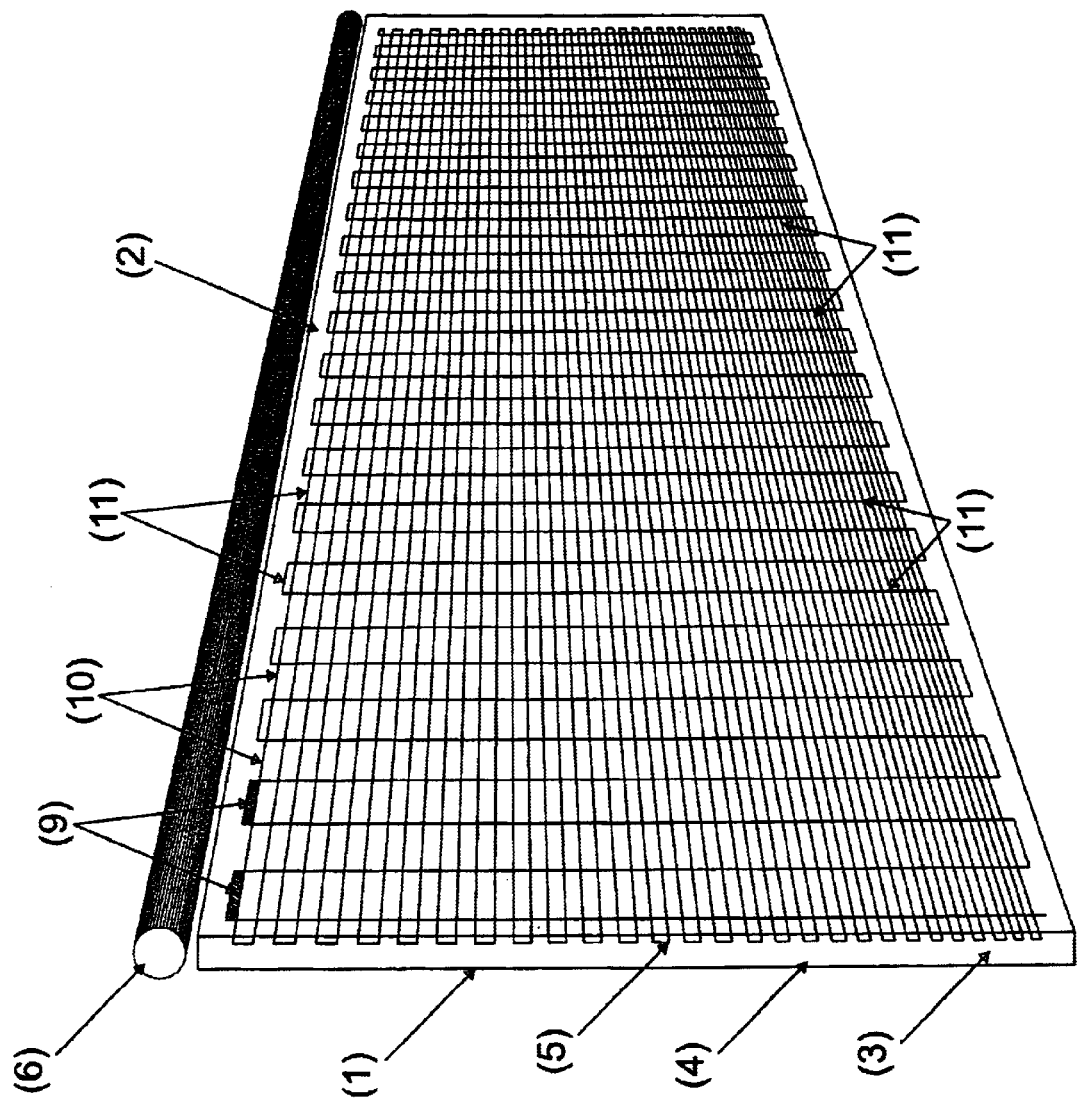
FIG. 1 is a schematic perspective drawing of a sign display assembly of the invention.

In reference to FIG. 1, the present invention is directed towards an improved sign display assembly including a transparent substrate (1) having a top facing surface (2) and opposite bottom facing surface (3) separated by linear edge (4). The top surface (2) has applied thereon a single continuous cut out line forming an interconnecting cellular matrix (5) adapted to increasingly and evenly distribute transmitted light from light source (6) over the entire top surface of the transparent substrate.

Figure 8:
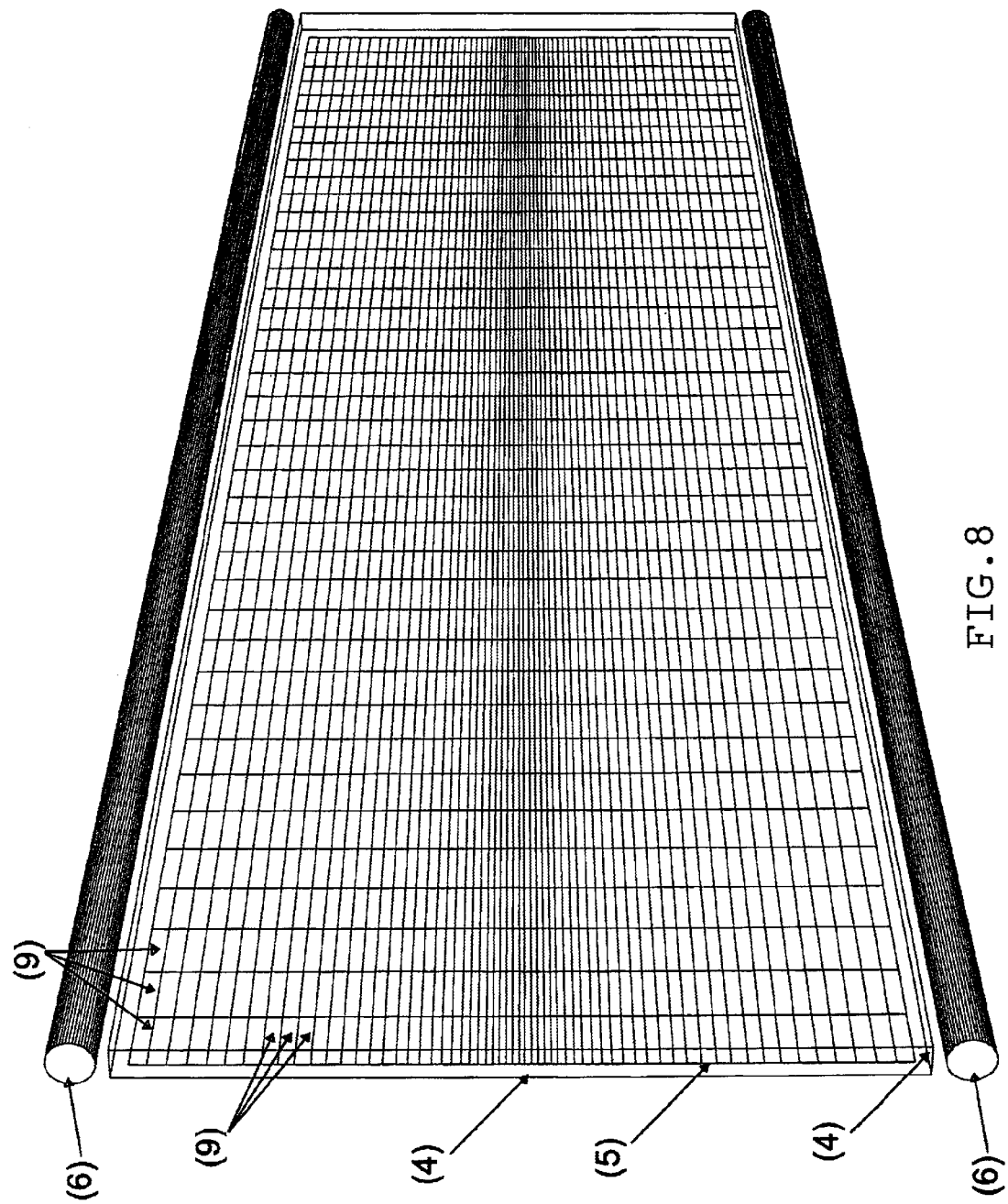
FIG. 8 is a representation of a display assembly showing a closed interconnecting cellar matrix.

FIG. 1 shows a single line forming an interconnecting matrix of cells of generally rectangular geometry substantially extending over the entire surface of the panel, and increasing in number (frequency) in a direction perpendicular to the light source while the frequency of cells in a direction parallel to the light source remains constant. The interconnecting matrix shown in FIG. 1 can be more readily viewed in FIG. 3 wherein the light source is positioned adjacent and extending parallel to the left edge. It is noted that the interconnecting matrix exhibits a series of alternating closed cells (9) and open cells (10) in regions closest to the linear edge. Alternatively, as represented in FIG. 8, the interconnecting matrix formed from the single continuous line can provide a series of closed cells (9) in regions closest to the linear edge.

Figure 3:
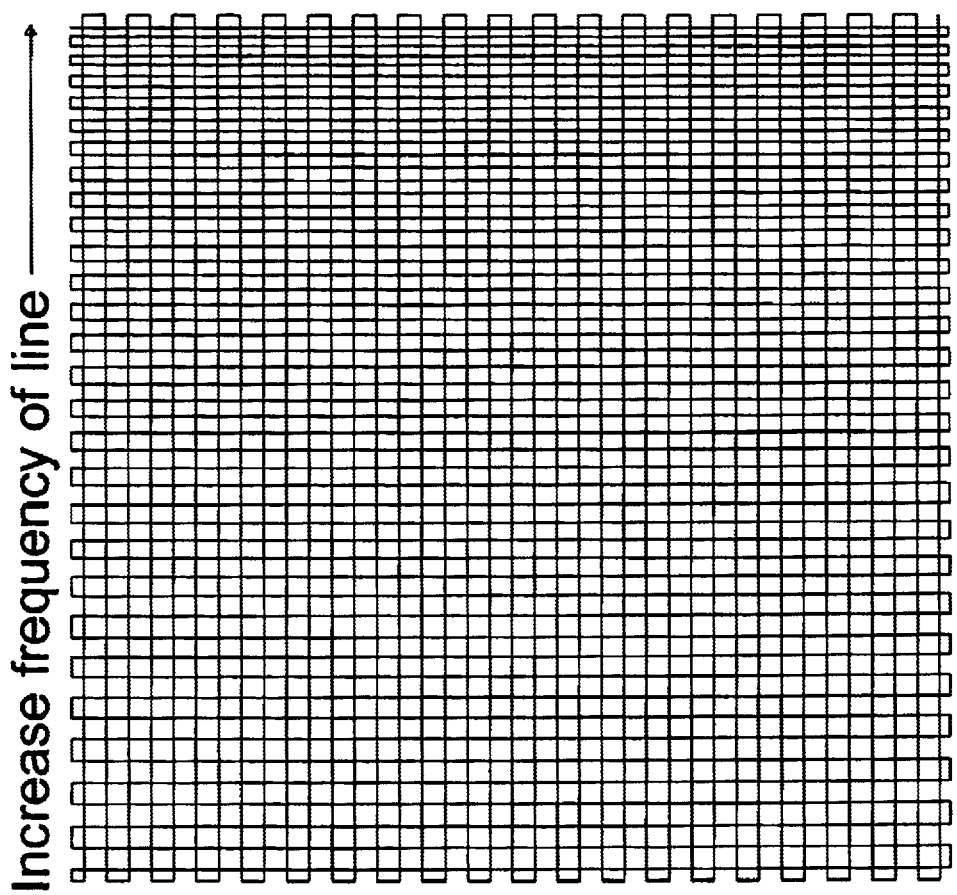
FIG. 3 is a representation of a single continuous line forming an interconnecting cellular matrix with increasing frequency of cells in one direction.

In a preferred embodiment represented in FIGS. 1 and 3, as the distance from the light source increases, the frequency of cells increases in a direction perpendicular to the light source so that transmitted light can be more readily reflected by cell edge(s) (11) running parallel to the light source. As the number of cells formed by the continuous line increases in frequency in a direction perpendicular to the light source, the number of cell edges (11) progressively increases in proportion. The closer these line edges (11) are together at remote distances from the light source the greater the amount of transmitted light is reflected from said edges (11) thereby illuminating the substrate (1).

The applicants have found that the external surface edges of the panel exhibit significantly improved illumination over the prior art because transmitted light is more readily reflected by edges (11) of closed cells closest to the linear edge (4). The prior art does not exhibit this feature of edges (11), hence do not illuminate effectively at the surface edges of a panel.

Figure 2:
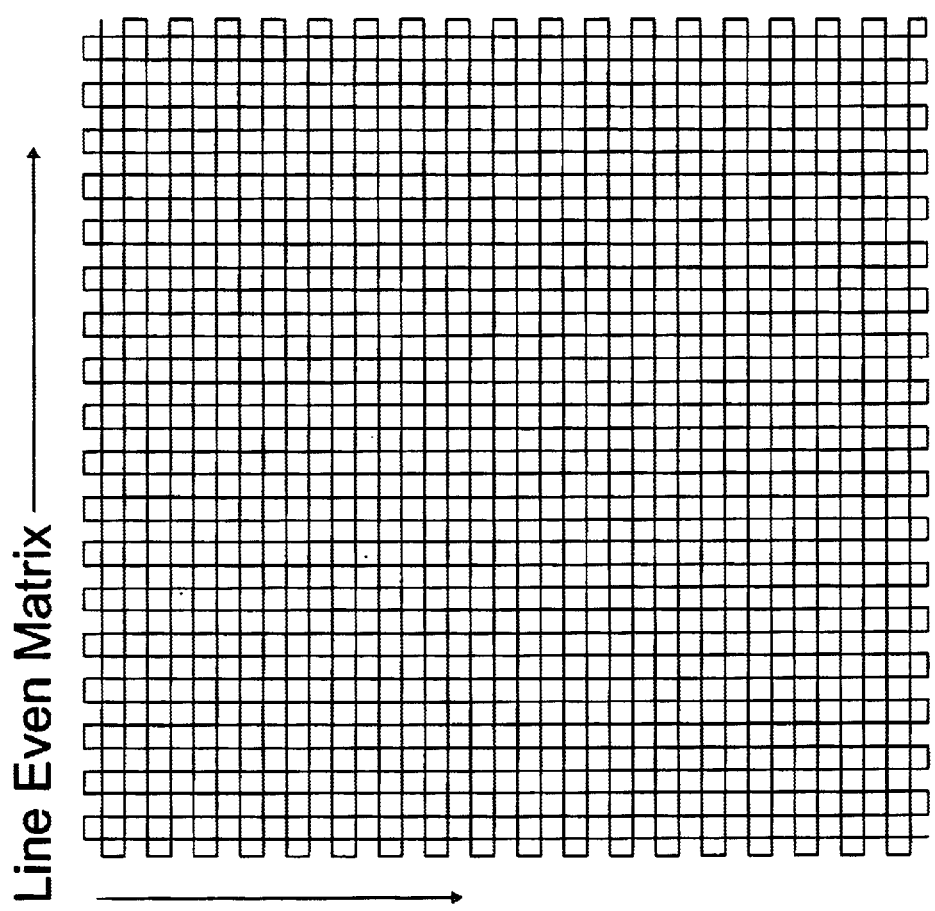
FIG. 2 is a representation of a single continuous line forming an evenly spaced interconnecting cellular matrix.

In an alternative embodiment to FIGS. 1 and 3, there is shown in FIG. 2 a single continuous line forming an interconnecting matrix having an evenly spaced number of cells in directions both parallel and perpendicular to a light source disposed along one edge of the matrix (not shown). In this embodiment the cells formed have a square geometry.

The light source (6) may be a flourescent tube shown positioned adjacent and extending parallel to one edge (5) from which light is transmitted throughout the panel.

The light source (6) is encased within a housing (not shown) so as to focus light emitted therefrom directly onto and through the panel via said one edge (5).

Figure 4:
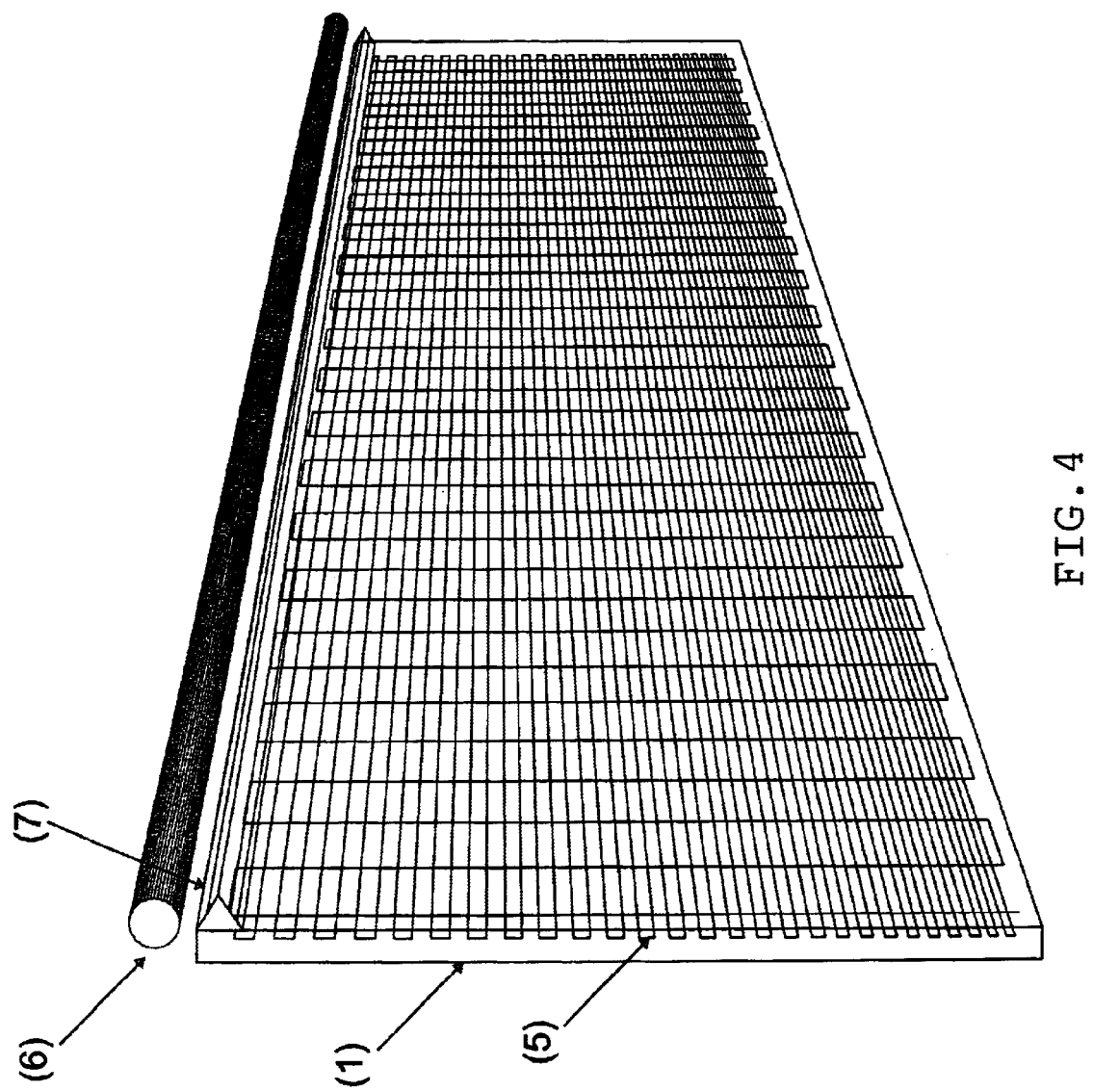
FIG. 4 is a representation of a display assembly having a prism placed on said substrate adjacent the light source.

In a specific embodiment of the invention shown in FIG. 4 the light source (6) is located above the surface of the panel at an angle and extending parallel to said linear edge (4). Positioned adjacent the light source is shown a prism (7) extending parallel to the light source. The prism (7) serves to increase the surface area over which scattered light emitted from the light source can be directed to intersect the top facing surface of the transparent substrate. The applicants have found that greater luminosity is achieved this way as well as improving the flexibility of positioning the light source.

Figure 5:
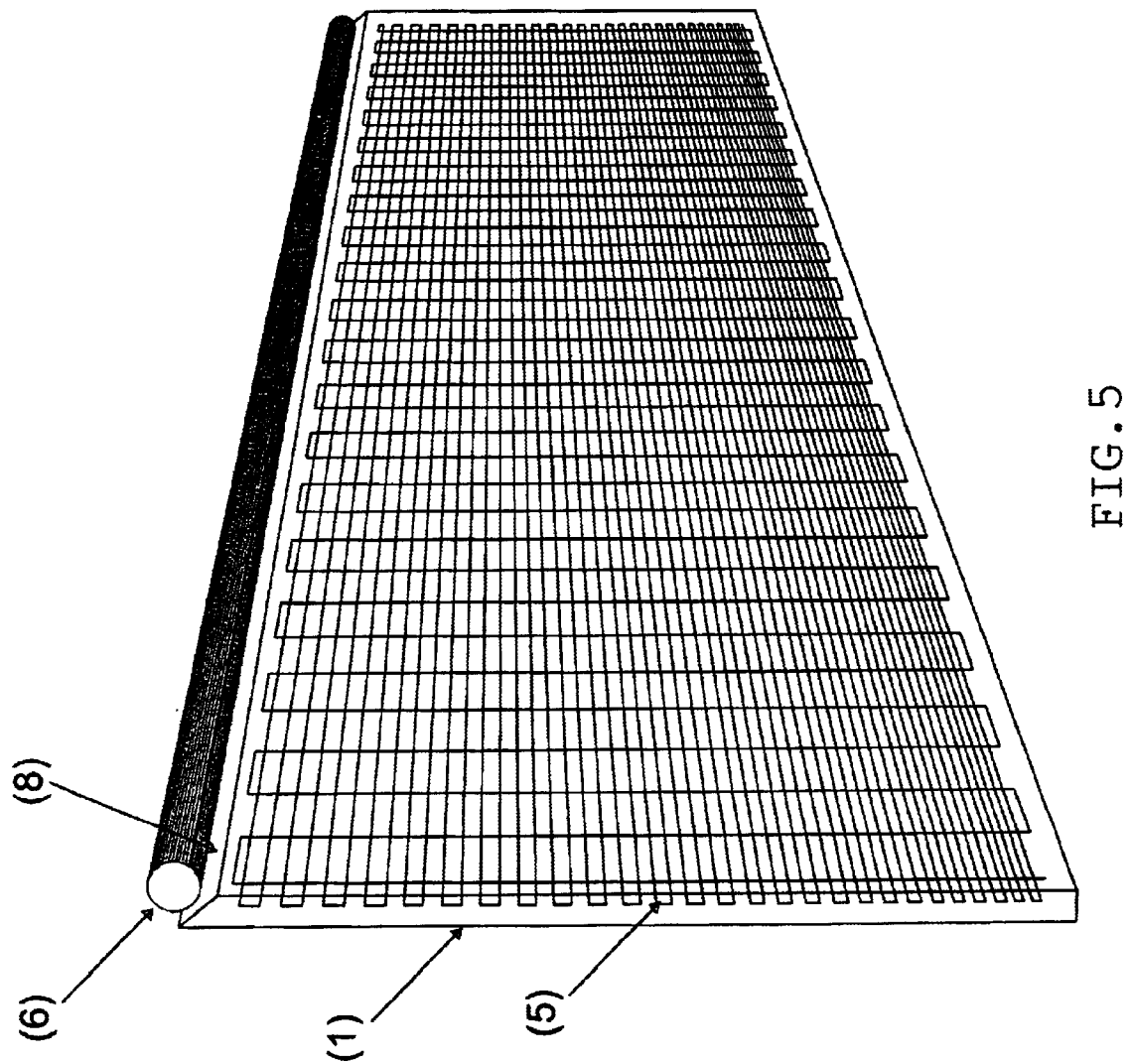
FIG. 5 is a representation of a display assembly showing an angled surface (edge) through which an adjacent light source transmits emitted light.

The applicants have also found in an alternative embodiment that the surface area of the linear edge (4) through which light is transmitted can be increased by changing the angle of the linear edge relative to incident light. For example, in FIG. 5 there is shown a display assembly having a substrate (1) with a linear edge (4) cut at an angle of about 45° thereby effectively increasing the aperture for light entering the substrate. The applicants have also found that significantly thinner substrates can be used in the order of between 4.5 mm to 6 mm in the display system of the invention.

Figure 6:
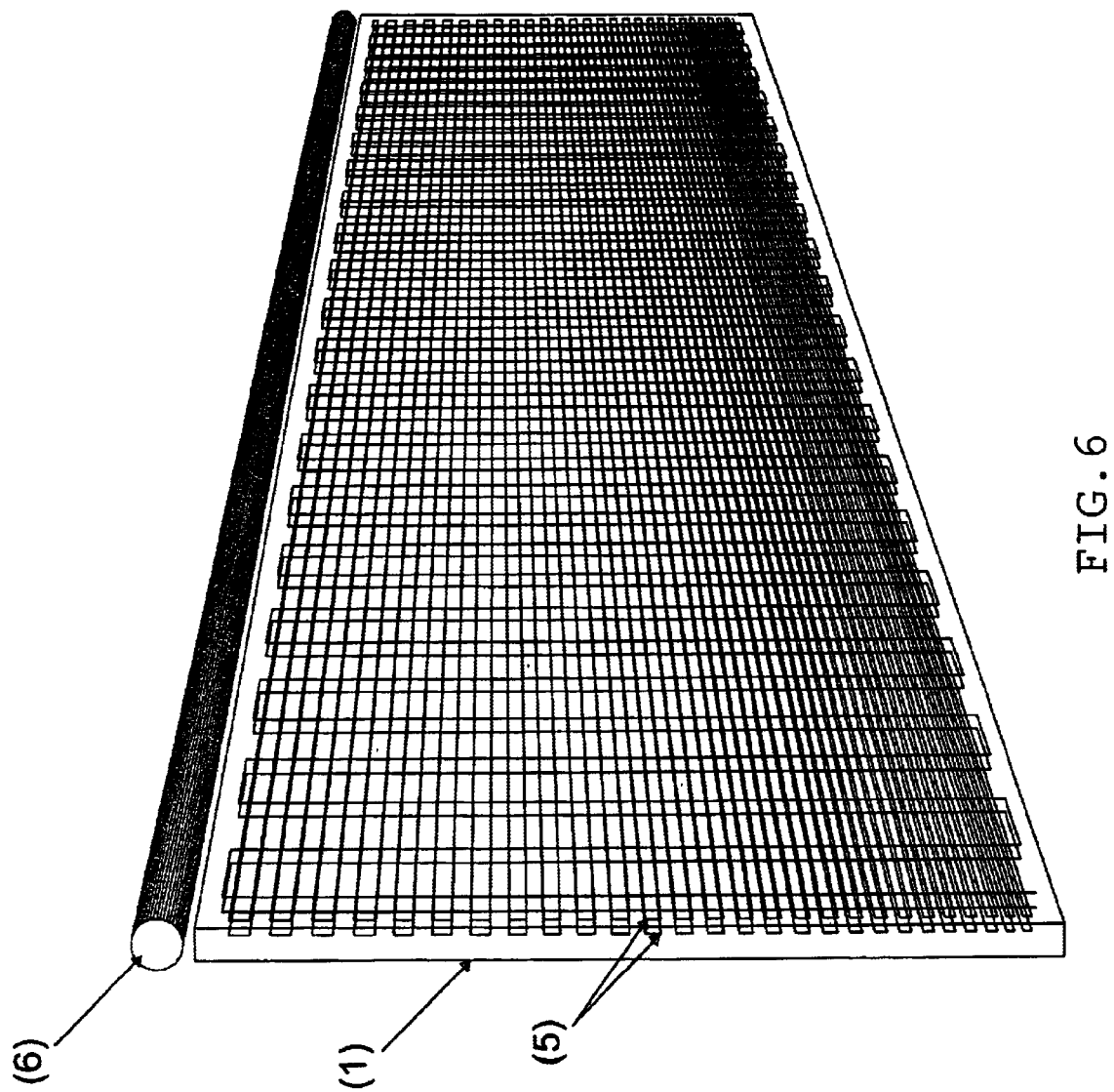
FIG. 6 is a schematic representation of a display assembly having a single continuous line forming an interconnecting cellular matrix on both surfaces of a substrate.

In a further embodiment of the invention shown in FIG. 6 there is represented a display assembly exhibiting a planar substrate having a single continuous line forming an interconnecting cellular matrix on either side of the substrate.

Figure 7:
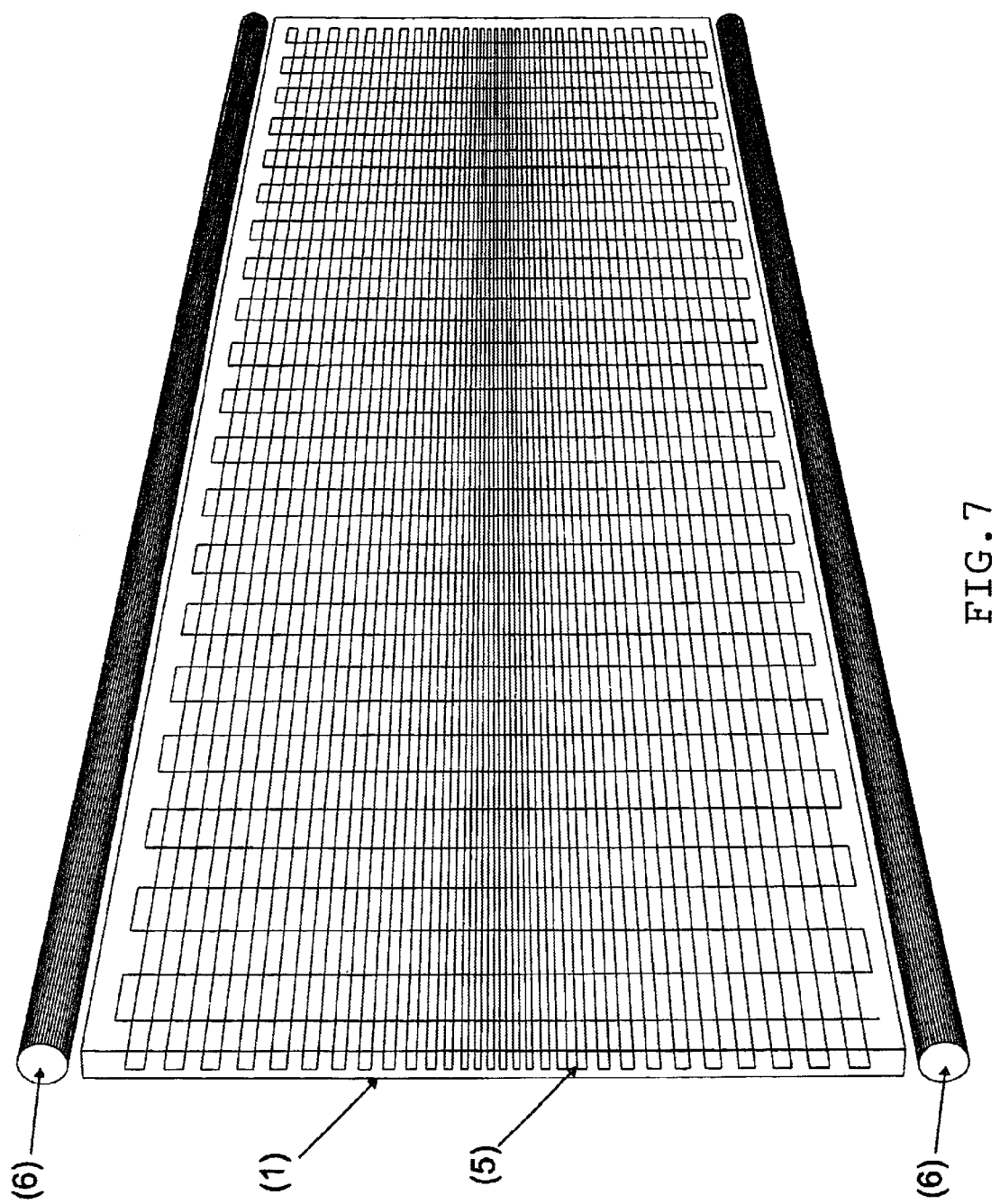
FIG. 7 is a representation of a display assembly having two light sources.

In yet a further embodiment of the invention shown in FIG. 7, there is represented a display assembly having two sources of light extending parallel and placed on opposite linear edges. As can be seen in FIG. 7 the frequency of cells increases progressively with distance from either light source. Once again the increase in frequency associated with the number of cells, increases in a direction perpendicular to either light source while the frequency of cells in a direction parallel to the light source remains constant.

The single continuous matrix is applied to a surface(s) of the substrate by means of etching, scarring, scratching, painting, sand blasting, screen printing, laser or the like. The single continuous matrix does not suffer the disadvantage of light absorption that occurs in the prior art series of lines matrix pattern.

The applicant's have found that the single continuous line matrix increases illumination across the entire surface of unusually large panels as well as effectively evenly distributing such illuminated light.

Finally it is to be understood that various alterations, modifications and/or additions may be incorporated into the various constructions and arrangement or parts without departing from the spirit and ambit of the invention.

What is claimed is:

1. An illuminated sign display assembly including:
   a transparent substrate having two oppositely facing surfaces separated by a surface forming an edge between said oppositely facing surfaces; and
   a light source on or adjacent to said edge for transmitting light between said opposite facing surfaces of said substrate
   wherein the at least one of said oppositely facing surfaces of said substrate has applied thereon a singles continuous line forming an interconnecting cellular matrix comprised of an array of cells, said matrix extending substantially over said one or both oppositely facing surfaces.

2. An illuminated sign display assembly according to claim 1, wherein at least one continuous line extends in a direction perpendicular and parallel to said light source.

3. An illuminated sign display assembly according to claim 1, wherein the interconnecting cellular matrix is chatacterised by an array of cells of generally rectangular or square geometry.

4. An illuminated sign display assembly according to claim 1, wherein the continuous line forms an alternating series of open and closed cellular structures, adjacent said edge.

5. An illuminated sign display assembly according to claim 1, wherein the array of cells in the matrix are evenly distributed in any one or both directions parallel and/or perpendicular to the lightsource so that there is substantially no change in cell frequency across the surface.

6. An illuminated sign display assembly according to claim 1 wherein the array of cells in the matrix are unevenly distributed in a both direction(s) perpendicular and/or parallel to the light source so that cell frequency changes in one and/or both directions across the surface.

7. An illuminated sign display assembly according to claim 1 wherein the array of cells in the matrix increases in frequency with increasing distance in a direction perpendicular to the light source.

8. An illuminated sign display assembly according to claim 1 wherein the transparent substrate is of any desired geometry selected from to planar, radial, undulating, corrugated, triangular or curved.

9. An illuminated sign display assembly according to claim 8 wherein the substrate has a thickness of less than 10 mm.

10. An illuminated sign display assembly according to claim 9, wherein the substrate has a thickness in the range of between 4.5 mm to 8.0 mm.

11. An illuminated sign display assembly according to claim 1, further including a prism positioned adjacent said light source so as to intersect and redirect scattered light from the light source through said substrate.

12. An illuminated sign display assembly which illuminates a sign and includes:
   a transparent substrate having oppositely facing support surfaces separated by at least one peripheral edge;
   a light source adjacent said at least one peripheral edge which emits light on to one of said oppositely facing support surfaces;

a first continuous groove extending over at least one of said oppositely facing support surfaces and a second continuous groove intersecting the first continuous groove at a plurality of points;

wherein the continuous groove describes a pathway on said at least one support surface which receives light from the light source at the intersection between the first continuous groove and at a plurality of points;

dispersion of light at the intersecting points forming an illuminating surface.

13. An illuminated sign display assembly which illuminates a sign and includes:

a transparent substrate having oppositely facing support surfaces separated by at lent one peripheral edge;

a light source adjacent said at least one peripheral edge which emits light on to one of said oppositely facing support surfaces;

a continuous groove extending over at least one of said oppositely facing support surfaces, the continuous groove overlapping itself to form one or more intersecting grooves;

wherein the continuous groove describes a pathway on said at least one support surface which receives light from the light source at the intersection formed by the continuous groove overlapping itself causing dispersion of light at the intersecting points forming an illuminating surface.

* * * * *